United States Patent [19]

Nash et al.

[11] 4,112,034

[45] Sep. 5, 1978

[54] BIAXIAL FILM PROCESS AND ROTARY APPARATUS THEREFOR

[75] Inventors: James L. Nash; Stanley J. Polich, both of Glen Falls; Philip H. Carrico, Saratoga, all of N.Y.

[73] Assignee: General Electric Company, Hudson Falls, N.Y.

[21] Appl. No.: 794,042

[22] Filed: May 5, 1977

[51] Int. Cl.² .............................................. B29D 23/04
[52] U.S. Cl. ...................................... 264/95; 264/209; 264/210 R; 264/290 R; 264/345; 425/72 R; 425/326.1; 425/379 R
[58] Field of Search .............. 264/95, 89, 209, 210 R, 264/310, 345, 290 R; 425/72 R, 326.1, 379

[56] References Cited

U.S. PATENT DOCUMENTS

| | | | |
|---|---|---|---|
| 3,210,803 | 10/1965 | Najar | 425/72 |
| 3,296,343 | 1/1967 | Buttolph et al. | 425/326.1 |
| 3,388,426 | 6/1968 | Schott, Jr. | 425/326.1 |
| 3,450,806 | 6/1969 | Matsuo et al. | 425/72 R |
| 3,775,523 | 11/1973 | Haley | 425/72 R |
| 3,891,374 | 6/1975 | Ninomiya et al. | 425/326.1 |
| 3,989,785 | 11/1976 | Bridge | 264/95 |
| 4,008,022 | 2/1977 | Carrico | 425/72 R |
| 4,009,975 | 3/1977 | Ninomiya et al. | 264/95 |

*Primary Examiner*—Jeffery R. Thurlow
*Attorney, Agent, or Firm*—James J. Lichiello

[57] ABSTRACT

In a biaxial blown tube synthetic resin film making apparatus, the extruder die, mandrel, the reheat ovens, and a hot air ring are caused to rotate and oscillate about a stalk moving coaxially therethrough to provide an improved flatter and more uniform film.

19 Claims, 8 Drawing Figures

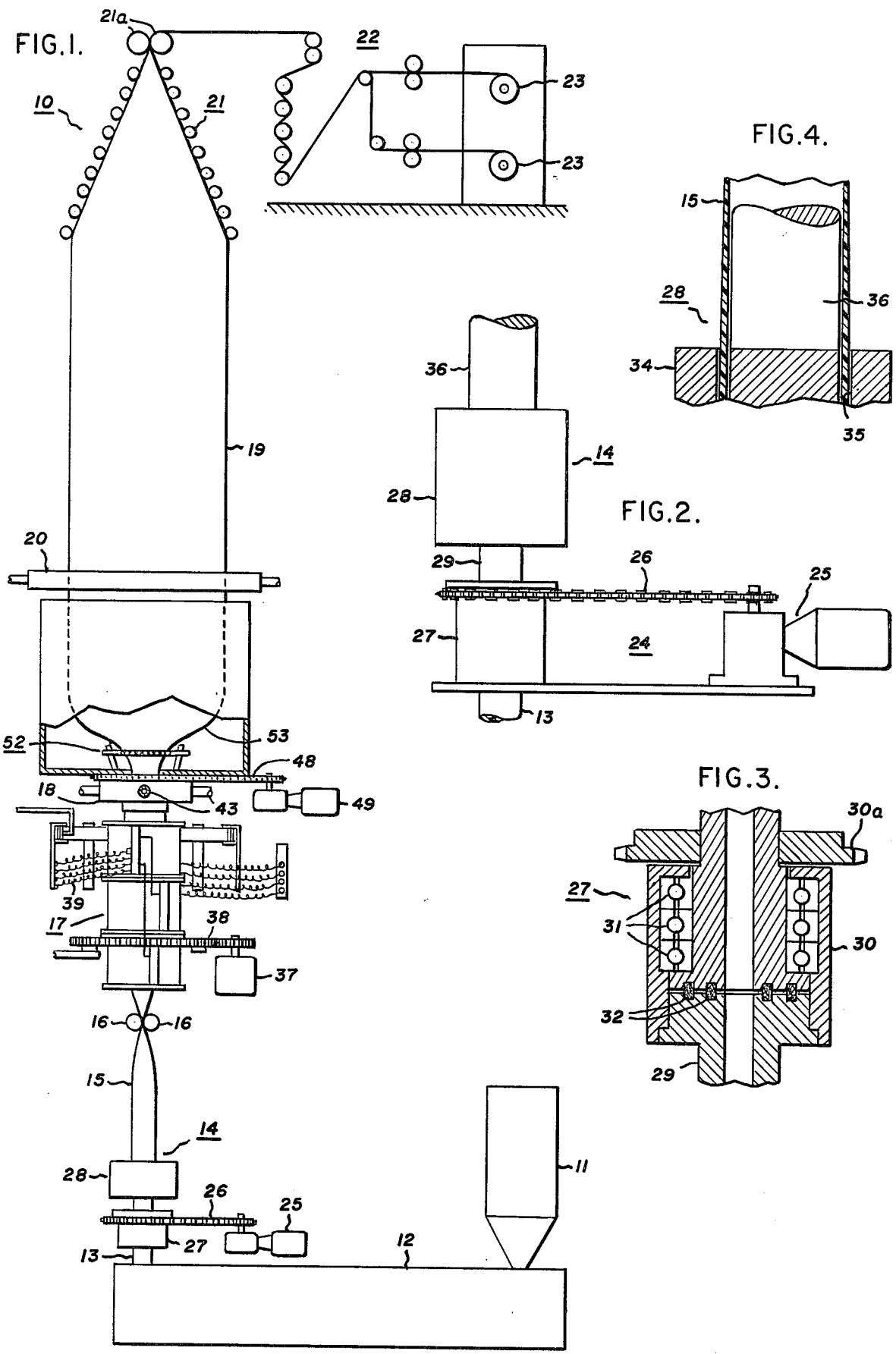

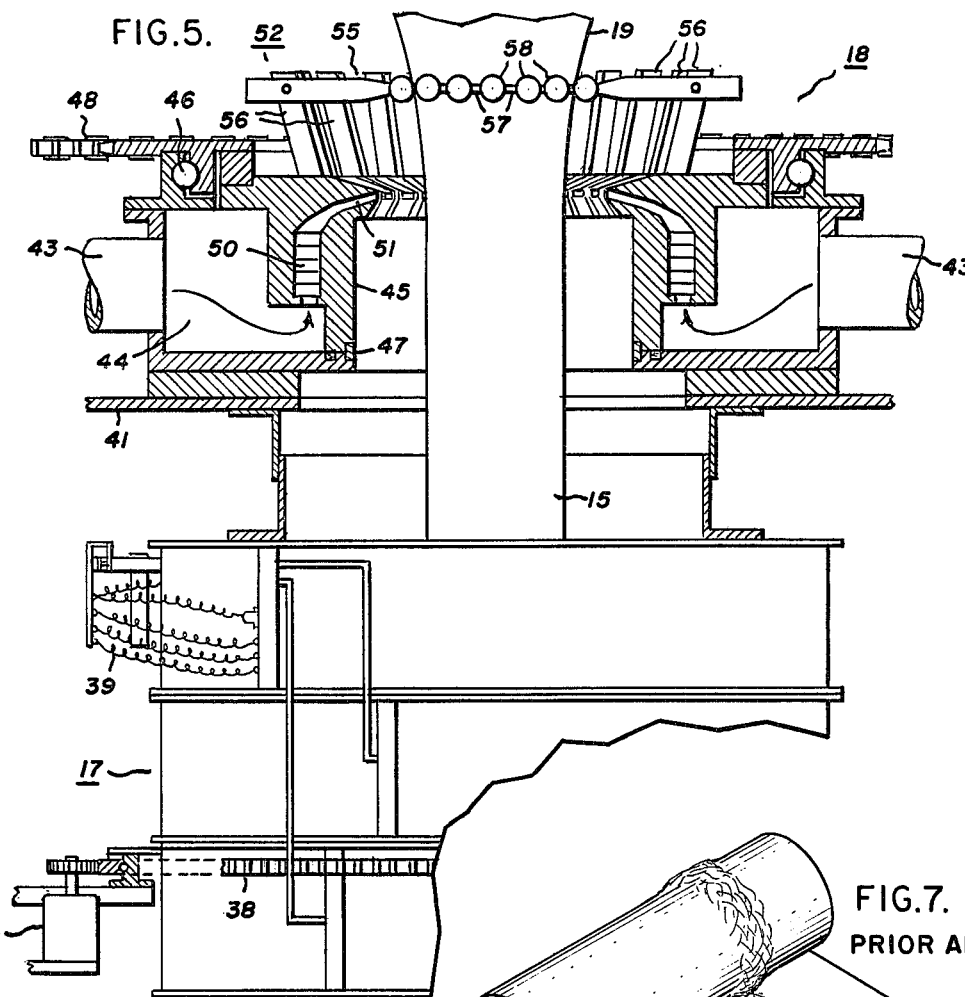
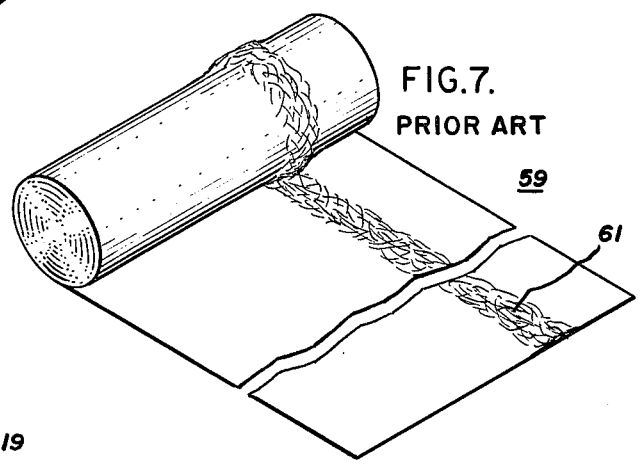
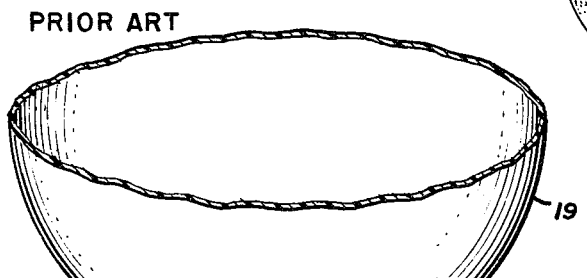
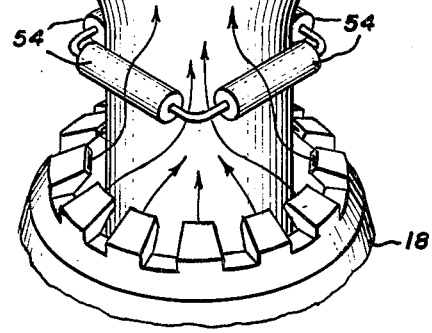
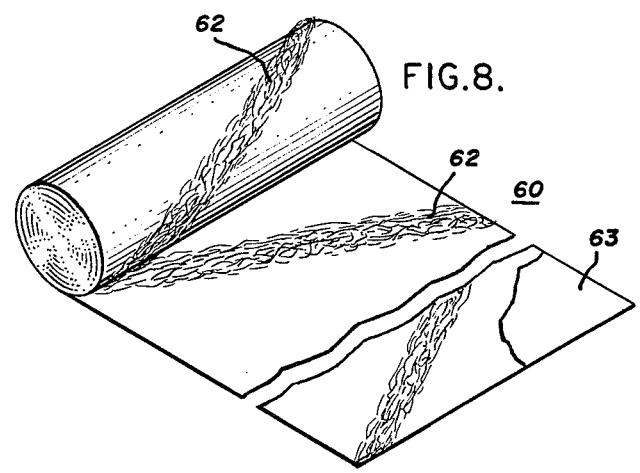

BIAXIAL FILM PROCESS AND ROTARY APPARATUS THEREFOR

BACKGROUND OF THE INVENTION

This invention relates to a blown tube process and apparatus for producing biaxially oriented synthetic thin guage resin film such as polypropylene film, and more particularly to a blown tube apparatus where the extruder die, reheat ovens, and hot air ring are caused to rotate and oscillate in unison to provide a flatter, more uniform polypropylene film.

In a well-known biaxially oriented blown tube apparatus and process, polypropylene resin is fed through an extruder die head to form a continuously moving cooled and solidified tubular section or stalk which then passes through a reheat furnace to bring it up to a predetermined orientation temperature. At the predetermined orienting or softening temperature, the stalk is insufflated or expanded into a very large thin gauge cylindrical structure referred to as a blown tube or bubble. This cylindrical structure is closed at one end by having it pass through a pair of nip rolls, and thereafter the double lay flat biaxially oriented section emanating from the nip rolls is slit and wound on storage or mill rolls.

One of the problems of such a process is that an irregular section or a gauge non uniformity causes a continuing build up in the film in a mill roll because the non uniformity is continually wound on itself in each turn. Large rolls so wound have differences in roll diameters because of this cascading effect. These differences, because of the creep characteristics of the film degrade the basic flatness eveness and straightness of the film. When precision winding machines such as capacitor roll winding machines are utilized to wind capacitor rolls, this degradation causes skewering and wrinkling in the winding film which are extremely undesirable factors.

SUMMARY OF THE INVENTION

It has now been discovered, that the extruder die and equipment utilized to increase or reduce the temperatures in the process lending up to the point of insufflation of the stalk must have their effects applied or directed against the stalk in a manner to have an affect on the uniformity of the gauge of polypropylene stalk circumferentially, in order to provide a film with optimum physical characteristics, particularly for electrical capacitor use. In one preferred form of this invention, the polypropylene stalk which only moves axially passes through a reheat oven which coaxially surround the polypropylene stalk and is caused to rotate in unison with a combination rotating die and mandrel. At the same time, a hot air ring which is positioned near the shoulder of the insufflated tube is also caused to simultaneously rotate synchronously with the reheat ovens and the die head. After a period of rotation, these rotating units are cuased to reverse their rotation and a process is periodically repeated to provide a form of oscillation movement.

DESCRIPTION OF THE DRAWINGS

This invention will be better understood when taken in connection with the following description of the drawings in which:

FIG. 1 is a schematic illustration of a blown tube apparatus of this invention.

FIG. 2 is a schematic illustration of the rotating die of this invention.

FIG. 3 is an enlarged schematic and cross sectional view of the die head rotator of FIG. 2.

FIG. 4 is an enlarged schematic and cross sectional view of the die and mandrel of FIG. 2.

FIG. 5 is a partial schematic and cross sectional illustration of the rotating reheat oven, the rotating hot air ring of this invention, and a bubble support system.

FIG. 6 is a schematic representation of the bubble support system for a polypropylene bubble which does not have a rotating hot air ring.

FIG. 7 is a schematic and exaggerated illustration of a polypropylene strip of the prior art with a gauge non uniformity.

FIG. 8 is a schematic and exaggerated illustration of a polypropylene strip of this invention with a gauge non uniformity.

PREFERRED EMBODIMENTS OF THE INVENTION

A schematic illustration of an apparatus utilized to provide polypropylene film by the blown tube process is shown in FIG. 1 as apparatus 10. In apparatus 10, polypropylene resin is fed into hopper 11 from where it passes into an extruder 12 where the temperature is elevated sufficiently to provide molten characteristics to the resin. The molten resin then passes upwardly through a feed duct 13 to a combined rotating die and mandrel unit 14 of this invention. The molten resin emanates from the die and mandrel unit as a thick walled tube section or stalk 15. In order to provide the proper travel or axial movement of stalk 15 through the die unit 14, a pair of tube advancer rolls 16 are employed to provide an upward pull on the stalk 15. Rolls 16 neck the stalk 15 so as to close off the stalk volumes below and above the rolls 16 around a central air pipe (not shown).

Stalk 15 then passes from the advancer rolls 16 into a rotating reheat oven unit 17 which may be a combination of one or more stacked ovens. In the oven 17 the temperature of the stalk 15 is raised to a predetermined level where the plasticity of the polypropylene is in the desired orientation range of the insufflation step. Stalk 15, after passing through the oven 17 is caused to move through a rotating hot air unit 18. Hot air ring unit 18 provides currents of hot air to be directed against the stalk 15 to stabilize and equalize the temperature at a constant and predetermined orientation level above that in the reheat oven. At this point, air is introduced into stalk from the central air pipe (not shown) to expand the stalk into the bubble 19, as illustrated.

After the stalk 15 has been expanded to a bubble form 19, it passes through a cold air ring 20 which cools the bubble to provide a fixed level of solidification of the polypropylene. Bubble 19 then passes upwardly through a collapse frame roller assembly 21 which tapers the bubble towards a line section through a pair of nip rolls 21. The nip rolls 21 pinch off the bubble 19 to retain a given amount of air pressure therewithin. In this process the film is biaxially oriented. It is oriented in the cross machine direction (CMD) because the expanding stalk or bubble provides lateral stretching. At the same time, the nip rolls provide an axial stretching of the bubble for orientation in the machine direction (MD). The polypropylene which emanates from the nip rolls emanates as a dual lay flat biaxially oriented sheet joined at the edges. At this point the polypropylene film runs through a slitting and winding assembly 22 wherein the polypropylene strip is slit to provide a pair of strips each of which are then wound on supply rolls 23, as illustrated.

An important feature of this invention is a rotating die mandrel unit 14, which is more particularly illustrated in FIGS. 2 and 3. Referring now to FIG. 2, the rotating die mandrel unit comprises a rotating assembly 24 which includes a motor and gear box unit 25, and a chain drive 26, which rotates the rotator 27. Rotator 27 is more particularly described with respect to FIG. 3.

Referring now to FIG. 3, rotator assembly 27 is illustrated as comprising a stationary apparatus 29 and a rotary apparatus 30. Rotary apparatus 30 with its sprocket drive 31 is mounted for rotation on stationary apparatus 29 by means of bearings 31, and is effectively sealed by means of seals 32. As the molten resin proceeds from the extruder 12 through duct 13, it enters the rotating die and mandrel assembly 28 as illustrated in FIG. 4.

Referring now to FIG. 4, a rotating die and mandrel assembly 28 comprises a die member 34 having a cylindrical orifice 35 therein through which the molten resin from duct 13 is caused to enter. The molten resin which emanates from die member 34 passes over a cylindrical quench mandrel 36. Quench mandrel 36 contains a cooling medium, as known in the art, for example in U.S. Pat. No. 4,008,022 Carrico assigned to the same assignee as the present invention, and reduces the temperature of the molten polymer emanating from the die 13 to cause it to solidify and to progressively move upwardly as a tube. In the present invention the mandrel 36 is connected to the die member 34. By means of the chain drive 26, the die 34 and the mandrel 36 are caused to rotate in unison so that the polypropylene stalk slips at the interface between the stalks and the mandrel 36. By this means, gauge irregularities are circumferentially distributed by the rotator of the die 34. Slippage of the stalk 15 permits the use of a stationary tube advancer (roll assembly 16) thus reducing the complexity. It furthermore avoids the need for a rotating bubble.

The rotating reheat oven unit 17 and hot air ring 18 are best described with respect to FIG. 5. Referring now to FIG. 5, there is illustrated a partial and schematic view of a combined hot air ring 18 and reheat oven unit 17. Reheat oven unit 17 includes a motor drive assembly 37 which rotates the furnace assembly through a ring gear 38. The internal surface of the ovens (not shown), include appropriate electrical radiant heaters arranged peripherally about the interior surface which are connected by means of electrical cables 39 to a source of power (not shown). These heaters operate in a temperature range of 700°-1200° F and provide heating circumferentially of the stalk. Coiled electrical cables 39 are sufficiently long to permit at least 360° of rotating of the reheat oven 17 and are suspended on trolley means. Reheat oven 17 may thus be defined as a circumferential or ring oven. As the stalk 15 passes through the reheat oven, its temperature is raised to a predetermined level which is ordinarily in the range necessary for insufflation. The temperature in the reheat ovens must be sufficiently high that all points of the stalk are brought up close to the required temperature. The stalk temperature is then raised by a small increment to the orientation level, within the hot air ring structure 18.

The hot air ring structure 18 of this invention is also best described with respect to FIG. 5. Referring again to FIG. 5, there is illustrated a partial and cross sectional view of a rotating hot ring structure 18. Air ring structure 18 is supported on a frame or platform 41 separate from the reheat oven 17 for independent rotation. Hot air for the air ring structure 18 is supplied from a source (not shown) through conduit 43 into an annular chamber 44. Fitted into the annular chamber is a hot air lip assembly 45. Lip assembly 45 forms a closure wall for chamber 44 and is rotationally mounted on chamber 44 through bearing means 46 and 47. The lip assembly 45 is driven by means of a chain drive 48 from a motor source of power 49 (FIG. 1). Air from annular chamber 44 passes through a series of flow distributors 50 and a specially shaped orifice 51 to be directed against stalk 15. The temperature of the air in the hot air ring 18 is from about 250° to 450° F and the flow rate is from 70-130 cub. ft. per minute with a stalk speed of from about 15 to 80 ft. per minute.

In addition to the roating die 14, reheat oven 17, and hot air ring 18, an improved bubble support system 52 is employed. This support system 52 is also fixed to the rotating lip assembly 45 as is illustrated in FIG. 1. Referring again to FIG. 1, the bubble support system 52 is illustrated as being interposed between the hot air ring assembly 18 and the shoulder section 53 of the bubble 19. The function of the bubble support system is not only to lend some stability and support to the bubble during the operation of the process and apparatus, but also to provide initial support during the start-up process when the bubble is first formed. A prior art support system is illustrated schematically in FIG. 6.

Referring now to FIG. 6, a section of the bubble 19 is shown as extending from the hot air ring 18 to the bubble shoulder 52. Directly above the hot air ring there is a series of cylindrical roll means 54 in circumferential and transverse relationship to bubble 19. These rollers are usually of a non-metallic or soft material such as teflon which lightly engage the bubble and are rotated by frictional engagement with the bubble. Usually four such rolls 54 are employed. It has been discovered that the optimum advantages gained by the rotary apparatuses of this invention were being detrimentally affected by the chanelling and localizing of hot air flow from hot air ring 18 around the rolls.

Channelling and localizing of this hot air has been significantly reduced by the ball arrangement illustrated in FIG. 5. Referring again to FIG. 5, a frame assembly 55 is shown as attached to the lip assembly 45 of hot air ring 18. A plurality of circumferentially mounted brackets 56 support a circular ring or axle 57 which surrounds the stalk 15. Mounted for rotation on the ring is a series of about 30 teflon balls 58 of about 1.0 inch diameter. The balls 58 are rotated by being in frictional engagement with tube 19 and because of their number and shape, they provide better distribution and equalization of the hot air from the hot air ring 18. An improvement in film guage is obtained through the use of this rotating air ring.

The rotating system of this invention comprises three units i.e., (1) die and mandrel unit, (2) reheat oven unit of one or more ovens, and a (3) hot air ring unit (including the bubble support) which are preferably operated in unison and are synchronized with respect to speed and origin. The rotational speed of each of the three units is adjusted to the same value at a common point in their rotation. The units then rotate at the same speed for 360° of travel. At that point a suitable control such as a microswitch for each unit is tripped and the unit is caused to move 360° in the reverse direction wherein a further microswitch is tripped and the rotational cycle is then repeated.

The electrical circuit which interconnects the three units is designed so that in the event one of the units trips its microswitch prior to the tripping of the other switches, there will be a delay in operation until the other microswitches are tripped. Then all three units being the reverse cycle simultaneously. This arrangement provides sufficient although not precise synchronization.

It has been discovered that operation, i.e., oscillation of the rotary units of this invention without synchronization unexpectedly actually reinforces film gauge irregularities at various positions about the periphery of the bubble 19. However, oscillation even without synchronization provides more uniformity than would be the case if none of the units oscillated. There are, however, various combinations of oscillations which may be used in the practice of this invention. Preferably a 360° max travel is employed to obtain better results.

In one practice of this invention a rotational speed of the rotating units may fall in the range of 4 to 15 minutes per revolution. A speed of 6 minutes per revolution gave good results with polypropylene film and approximates 5 revolutions of the entire bubble for one bubble.

The practice of this invention provides enhanced control over the many variables in the bubble process of manufacturing biaxially oriented polypropylene film and improves the final product, particularly with respect to roll uniformity and flatness of the film as well as with respect to bag and camber. Thick and thin spots in a film strip as a result of gauge variations are very detrimental to electrical grade films used in capacitors. The improved process steps of this invention are directed to the rotation or oscillation of the noted three units to perform their simultaneous heat treating and smoothing functions circumferential of the moving stalk. Initially the die and mandrel rotates while the stalk does not rotate, but moves axially from the die. Then the reheat ovens apply a uniform exposure to heat because of the rotating reheat ovens. And finally, a hot air ring provides uniform drafts of hot air curcumferentially of the axially moving stalk. All units must be carefully coaxially aligned to prevent hot spots.

The practitioner has a choice of changing the many process variables such as flow rate, resin temperature, die opening, etc., to change the quality of the final film. However at the point where this invention starts these variables have been controlled to a very precise degree, and yet the minor variations which occur and which are indeed small when viewed along, build up rapidly on more or less standard roll which may weigh about 500 to 1000 lbs., be 4 to 7 feet wide and contain at least 60,000 ft. of film. In some bubble processes of the non biaxially oriented kind, it has been known to rotate a die head or even the nip rolls and other upper components. The marked improvements of the present invention are obtained by the rotation of the temperature related components of the process, i.e., die and cooling mandrel, reheat oven and hot air ring, and their rotation and oscillation at predetermined rates.

The practice of this invention also provides a trouble indicator in the film making process. For example, in the prior process the major if not solely mechanically adjustable item was the die which was adjusted to provide a thicker or more uniform thickness final film. When an irregularity occurred in the final film, the die was usually adjusted to accommodate the irregularity wherever else it occurred in the system, usually in an unknown location. If, for example, the irregularity occurred in the reheat oven, oscillation of the oven units could very well magnify the problem or create a more serious problem with the other variables in the system. By the same token, oscillation of one variable not contributing to the problem could also magnify the problem if it were occurring later in the cycle. By the present invention, the operation is provided with selection means whereby he may change one or more variables to find the variable which is causing a problem.

Many variations of the mounting and drive means of this invention will become apparent to those skilled in the art. All units may be separately mounted or mounted for integral rotation. Several intermediate combinations are possible. Drive means may follow the same format.

In prior biaxial film processes where a gauge non uniformity appeared, it became rolled up on itself over thousands of feet of film in a roll until a significant diameter difference is noted. After storage for only a short period of time, the creep characteristics of the film cause a set in the film such that upon unrolling there is a distinct unevenness in the film. When such a roll is placed in a winding machine there are various detrimental results, notably wrinkling of the film in the winding machine because the irregularity causes variation in rate of feed of the film from the longer or smaller roll diameter embodying the non uniformity. When the film has a camber, because for example of a ridge in the roll diameter at one end of a roll, the straight feed on a winding machine causes wrinkling of the film being taken off the roll.

The present invention is a unique defect handling and distributor arrangement. To some degree, because of its temperature effects it tends to ameliorate some film irregularities. To a greater extent, it distributes the irregularities throughout the film strip or bubble surface. It operates in one respect to remove the registration effect of film irregularities in a roll and to distribute them laterally over a roll.

This distribution becomes even more important in film metallizing processes where a film web is passed through an evacuated and heated chamber wherein aluminum is vacuum deposited on the film. Wrinkling and bagginess in the film is exceedingly difficult to handle in such a process. The film of the present invention lays flat under these extreme conditions because of its unique non uniformity distribution structure.

For example, referring now to FIG. 7, there is schematically illustrated a partly unrolled section 59 of the film of the prior art. In the film section 59, the line 61 denotes a line of a non uniformity, for example an area of a thicker film. This area 61 is axial, i.e., in the machine direction and is wound up on itself. In FIG. 8 illustrating the film section 60 of this invention, the same non uniformity now numbered 62 is distributed laterally or, in effect, in both the machine direction and cross machine direction first in one CMD and then in the opposite CMD. Other irregularities are distributed laterally depending on the rotation and oscillation. Oscillation of 180° provides a distribution in CMD over one half the film width. A metallized layer 63 on this film strip represents an improved electrode and dielectric for capacitor use. It is characterized by having linear or series irregularities, non uniformity, or defects following a bias distribution pattern which has significant lateral or diagonal directions extending over about one half or more of the film width in one CMD before reversing to provide a diagonal path in an opposite CMD. This film strip is much more stable when passing through a vacuum metallizer due to its reduced bagginess and chamber while being unwound, passed through the vacuum chamber in an unsupported state and then being rewound.

While this invention has been disclosed with respect to particular embodiments thereof, numerous modifications may be made by those skilled in the art without departing from its true spirit and scope. Therefore, it is intended that the appended claims cover all such modifications and variations which come within the true spirit and scope of the present invention.

What is claimed as new and desired to be secured by Letters Patent of the United States is:

1. In a bubble apparatus for producing biaxially oriented synthetic resin film comprising an extruder to extrude molten resin in stalk form, means insufflate said stalk, and means to slit the insufflated stalk, the improvement comprising:
    (a) an annular die for extruding molten resin in stalk form
    (b) mounting means mounting said die for rotation about its vertical axis independent of said extruder whereby resin from said extruder is extruded from said annular die in a non rotating stalk form
    (c) a cylindrical cooling mandrel mounted coaxially with said annular die for rotation therewith whereby said non rotating stalk slides axially and circumferentially over said rotating mandrel
    (d) drive means for rotating said die and mandrel
    (e) control means to control said drive means to rotate said die and mandrel
    (f) a reheat oven coaxially positioned in said apparatus with respect to said stalk to receive the said stalk from said die
    (g) heating means to raise the temperature in said oven
    (h) mounting means adapting said oven for rotation about the vertical axis of said die
    (i) drive means rotate said oven
    (j) advancing means to advance said stalk through said rotating oven and
    (k) control means to control said drive means and rotate said oven.

2. In a bubble apparatus for producing biaxially oriented synthetic resin film comprising an extruder to extrude molten resin in stalk form, means to insufflate said stalk, and means to slit the insufflated stalk, the improvement comprising:
    (a) a reheat oven coaxially positioned in said apparatus with respect to said stalk to receive the said stalk from said extruder
    (b) heating means to raise the temperature in said oven
    (c) mounting means adapting said oven for rotation about the longitudinal axis of said stalk
    (d) drive means to rotate said oven
    (e) advancing means to advance said stalk through said rotating oven and
    (f) control means to control said drive means and rotate said oven.

3. The invention as recited in claim 1 wherein:
    (a) a hot air ring is coaxially positioned in said apparatus with respect to said stalk next adjacent the point of insufflation
    (b) said ring comprising an annular chamber defining a hot air inlet and radially inwardly directed hot air exits
    (c) mounting means mounting said ring for coaxial rotation with said stalk whereby hot air from said hot air exits is directed against said stalk which is moving axially through said ring
    (d) drive means to rotate said hot air ring
    (e) control means to control said drive means to rotate said hot air ring.

4. The invention as recited in claim 1 wherein each said mounting means adapts its respective apparatus for independent rotation.

5. The invention as recited in claim 1 wherein said control means controls its apparatus independently.

6. The invention in claim 1 wherein:
    (a) hot air ring comprises a stationary outer annular chamber wall,
    (b) an inner wall defining radially inwardly directed hot air exits and closing said annular chamber,
    (c) means mounting said inner wall for coaxial rotation with respect to said outer wall.

7. The invention as recited in claim 1 wherein:
    (a) an annular bubble support ring surrounds said stalk above said hot air ring,
    (b) a circumferential row of small balls mounted on said ring for polar rotation with the ring as their axis of rotation,
    (c) said stalk frictionally engaging said balls to rotate said balls on their axis and to support the stalk,
    (d) means mounting said ring for coaxial rotation with respect to said stalk.

8. The invention of claim 7 wherein said mounting means is said hot air ring.

9. In a bubble process for producing biaxially oriented synthetic resin film wherein the resin emanates from an extruder, passes over a cooling mandrel, enters a coaxial reheat oven, passes coaxially through a hot air ring, is insufflated and thereafter slit into film the improvement comprising rotating said reheat oven slowly with respect to said stalk.

10. In a bubble process for producing biaxially oriented synthetic resin film wherein the resin emanates from an extruder, passes over a cooling mandrel, enters a coaxial reheat oven, passes coaxially through a hot air ring, is insufflated and thereafter slit into film the improvement comprising rotating said hot air ring and said reheat oven slowly with respect to said stalk.

11. In a bubble process for producing biaxially oriented synthetic resin film wherein the resin emanates from an extruder, passes over a cooling mandrel, enters a coaxial reheat oven, passes coaxially through a hot air ring, is insufflated and thereafter slit into film, the improvement comprising slowly rotating said die and mandrel and said reheat oven coaxially with respect to said stalk.

12. In a bubble process for producing biaxially oriented synthetic resin film wherein the resin emanates from an extruder, passes over a cooling mandrel, enters a coaxial reheat oven, passes coaxially through a hot air ring, is insufflated and thereafter slit into film, the improvement comprising rotating each of said die and mandrel, said reheat oven, and said hot air ring coaxially with respect to said stalk.

13. The process of claim 12 wherein said units are selectively rotated.

14. The process of claim 12 wherein said units are independently rotated.

15. The process of claim 12 wherein said units are rotated in unison.

16. The process of claim 9 wherein said rotation is continuous oscillation over 360° of rotational travel.

17. The process of claim 9 wherein the reheat oven is oscillated simultaneously therewith.

18. The process of claim 10 wherein the hot air ring is oscillated simultaneously therewith.

19. The process of claim 18 wherein said rotational speed is in the range of from about 4 to about 15 minutes per revolution.

* * * * *